United States Patent

[11] 3,578,151

| [72] | Inventor | John H. Crawford |
| --- | --- | --- |
| | | Corvallis, Oreg. |
| [21] | Appl. No. | 780,061 |
| [22] | Filed | Nov. 29, 1968 |
| [45] | Patented | May 11, 1971 |
| [73] | Assignee | Leading Plywood |
| | | Corvallis, Oreg. |

[54] SHEET CONVEYOR SYSTEM
3 Claims, 5 Drawing Figs.

[52] U.S. Cl. .................................................. 198/230,
198/190
[51] Int. Cl. ........................................... B65g 45/00
[50] Field of Search ....................................... 198/229,
230, 231, 190, 193, 202, 117, 129, 139; 156/545, 546

[56] References Cited
UNITED STATES PATENTS

| 2,416,622 | 2/1947 | Griffin et al. ................. | 198/230X |
| --- | --- | --- | --- |
| 2,846,975 | 8/1958 | Hennessey ..................... | 198/230X |
| 2,870,808 | 1/1959 | Mann et al. ................... | 198/190X |
| 2,987,988 | 6/1961 | Robledano .................... | 198/190X |
| 3,212,631 | 10/1965 | Thompson ..................... | 198/230 |
| 3,279,587 | 10/1966 | Gray et al. .................... | 198/190 |
| 3,464,537 | 9/1969 | Thull ............................. | 198/190X |

Primary Examiner—Andres H. Nielsen
Attorney—James D. Givnan, Jr.

ABSTRACT: A conveyor system is disclosed for the transfer of sheet material. The traveling components comprise a multitude of replaceable elastic members each identically entrained about powered roller means. The system presently disclosed is adapted for conveying sheet material which is to be treated while being conveyed with additional structure being disclosed for cleaning of the elastic conveyor components. Toward this end a rinse is provided for the conveyor components along with means for removing water particles from said components prior to their again receiving delivered sheet material to be treated.

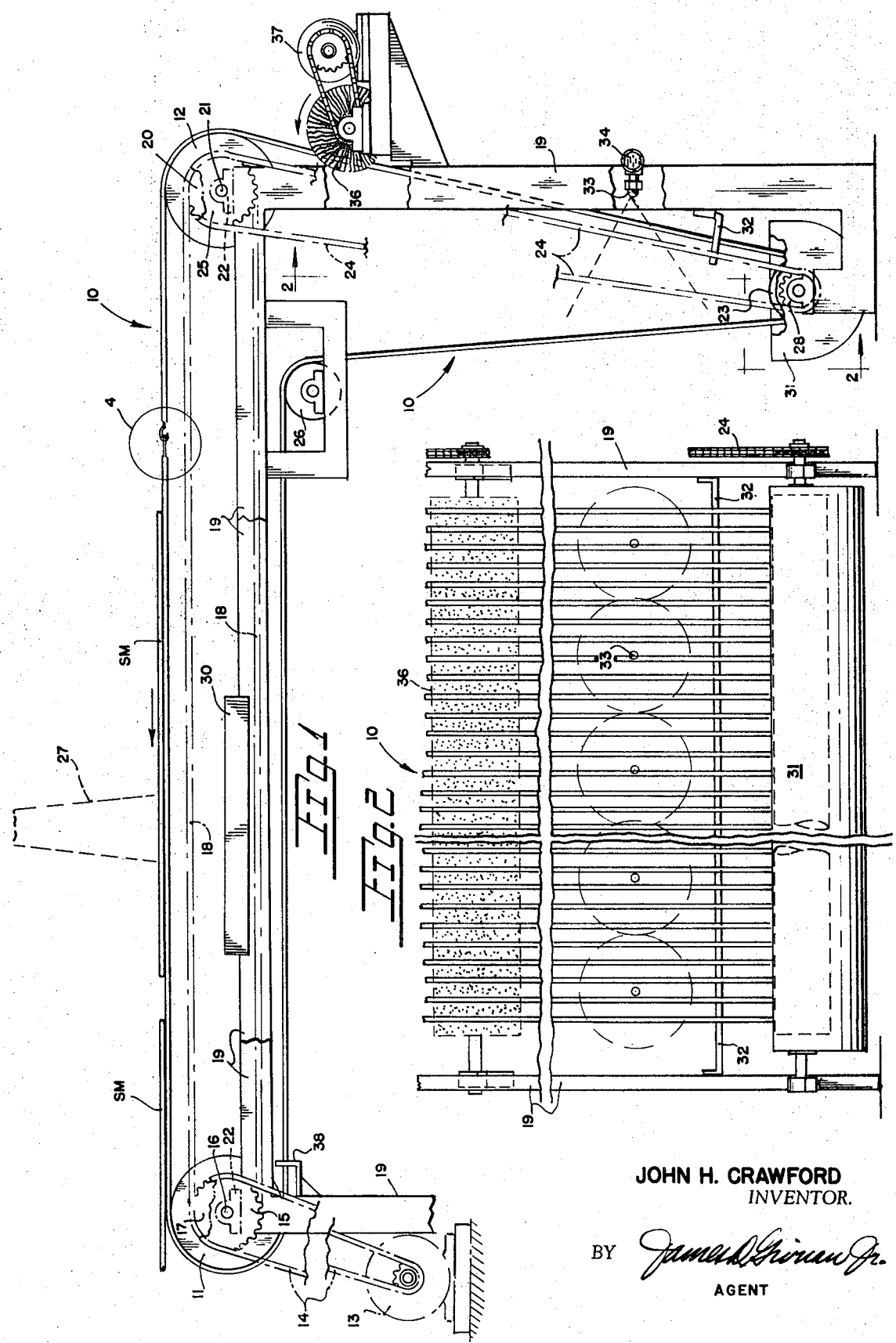

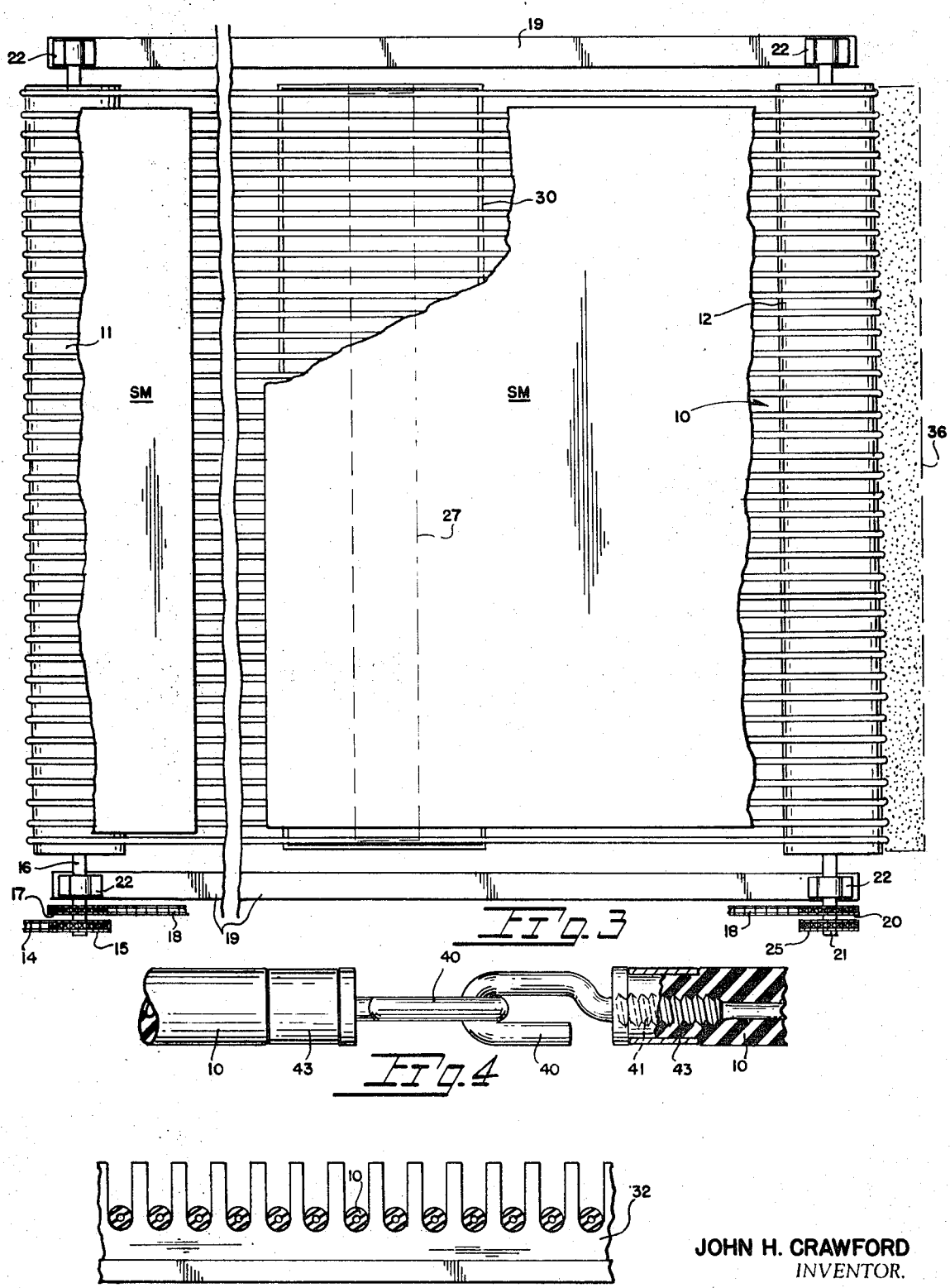

SHEET CONVEYOR SYSTEM

BACKGROUND OF THE INVENTION

The present invention relates generally to conveyor systems and more particularly to a conveyor system wherein the traveling components of the system are of a size and shape resulting in minimum deposit of foreign material thereon and which components are cleansed of the deposit prior to subsequent contact with additional material to be treated.

The present conveyor system is adapted for use in the transporting of the sheet material past a station whereat a spray application is made to one side of the sheet material. In the plywood manufacturing art the recent utilization of glue spray equipment for applying glue both to the inner veneer core laminates and faces of a plywood sheet has brought forth the need of providing a conveyor system whose traveling components may be cleansed of spray material. It is important that glue sprayed onto said traveling components not be transferred to the underside of those veneer pieces which will eventually become the outer or faces of a plywood sheet. Such glue markings on visible surfaces of a plywood sheet results in the plywood sheet's grade and value being reduced. Further, the inadvertent transfer of glue to the outer sides of a face sheet of a plywood panel will result in the outer side thereof adhering to the adjacent panels during the pressing operation. To avoid undesirable transfer of the sprayed material from the traveling conveyor components to the underside of the face sheets an arrangement is provided to continuously clean the multitude of traveling conveyor components.

A further important object of the present invention is the provision of elastic conveyor components which support the sheets being conveyed in an horizontal plane for passage beneath the spray station with the novel conveyor components avoiding undesirable pickup of sprayed material. Accordingly, a multitude of resilient conveyor members are provided, each of small sectional dimension which accordingly deter the deposit of sprayed material.

A further advantage of the present system is that it permits simple, expeditious replacement of any conveyor component with little down time to the system. Replacement of a damaged conveyor component is achieved by simply entraining the elastic conveyor component about supporting rollers and attaching the opposite ends of said component in a slightly tensioned manner thus insuring driving contact with its supporting rollers. Where a multitude of traveling components are provided as herein disclosed it is entirely possible to continue operation regardless of some of said components being removed from the system for replacement thereof during a preset maintenance period.

SUMMARY

The conveyor system herein described is used advantageously, though not restrictively, for the transfer of sheet material beneath a spray station. The conveyor system components are of a design as to avoid undesirable transfer of sprayed material to the opposite side of the plywood face sheets the latter ultimately comprising the outer surfaces of a plywood sheet. It will be apparent that the present system is usable with any material to be transferred beneath a station whereat material is deposited onto the sheet material. Further provision is made for expeditious replacement of conveyor components.

BRIEF DESCRIPTION OF THE DRAWINGS

The accompanying drawings;

FIG. 1 is a side elevational view of the present conveyor system with a framework therefor shown in somewhat schematic form, FIG. 2 is a sectional elevational view of the system taken along irregular line 2–2 of FIG. 1, FIG. 3 is a plan view of FIG. 1 with sections of the conveyor components removed and showing sheet material carried thereon passing through a spray station, FIG. 4 is an enlarged typical view of the attached ends of an elastic conveyor cord circled at 4 in FIG. 1, and FIG. 5 is a plan view of a combined wiping and spacer means through which the conveyor cords pass.

DESCRIPTION OF PREFERRED EMBODIMENT

With continuing reference to the accompanying drawings wherein like reference numerals indicated like parts, the reference numeral 10 indicates generally a multitude of parallel, elastic conveyor components in the form of rubber cords. The cords 10 are entrained on powered rollers and have a horizontal upper run for conveying sheet material through or past a station. FIG. 1 shows, in side elevation, the entrainment of one such elastic cord 10 which is typical of the multitude of mutually parallel cords.

A pair of horizontally spaced, cylindrical rollers are indicated at 11 and 12 having smooth surfaces and driven by an electric motor 13 as follows: A first chain drive 14 transmits power to a sprocket 15 keyed to a shaft 16 for driving roller 11 while a transfer drive includes a second sprocket 17 on shaft 16, a chain 18 and a sprocket 20 mounted on a shaft 21 which rotatably mounts the roller 12. The shafts 16 and 21 are supported at their ends within bearings 22 typically shown in FIG. 1. The bearings are mounted upon a machine framework 19, shown in broken lines for purposes of illustration with the unseen side of the framework being substantially identical with the side shown. A third powered roller at 23 is located a vertical distance below the right-hand roller 12, within a tank 31 and is driven at 28 by a chain drive 24 powered by a second sprocket 25 on shaft 21. An idling roller 26 is journaled on the framework 19 and serves to properly locate the runs of the cord 10 preparatory to the cords downward entrainment beneath rotatable means in the form of a roller 23.

In the embodiment shown the main roller 12 is desirably located adjacent an off loading conveyor belt (not shown) for the successive reception of sheet material SM therefrom in a convenient manner while the main roller 11 constitutes a discharge point for the sheet material being treated and may conveniently discharge onto other conveyor or stacking means.

A spray discharge station is located intermediate the main rollers extending transversely across the conveyor system to treat sheet material carried in an horizontal direction therebetween as by a spray discharge, the outline of the spray pattern being shown in dashed lines at 27. The spray pattern is of a transverse dimension to extend past the ends of a sheet being conveyed to uniformly coat the entire surface of said sheet material. Also some sprayed material will be deposited on the cords between successive sheets. A catch basin is indicated at 30 which underlies the upper run of the conveyor cords and receives excess sprayed material discharged past the ends and side of consecutive sheets.

The cords 10 are entrained on powered rollers and have a horizontal upper run for conveying sheet material through or past the station. FIG. 1 shows, in side elevation, the entrainment of one such elastic cord 10 which is typical of the multitude of cords spaced along rollers 11 and 12. Wherein the present conveyor system is utilized for the application of glue to 8 foot veneer cores and face sheets for plywood the main rollers 11 and 12 will accordingly be somewhat longer than the wood material being carried.

Disposed in a parallel manner along the aforementioned rollers is the multitude of elastic cords 10 which may be of natural rubber at an interval of approximately 1 to 2 inches between their centers with the cords themselves being circular and having a diameter of approximately three-eighths of an inch. It is to be understood that the spacing and also the cord dimension above noted may easily be varied to suit the weight of sheet material being handled. Later described spacer plates may be altered to affect the desired spacing of the cords. In one embodiment, for example, the cords adjacent the outer ends of the rollers 11 and 12 in a typical installation may be spaced at an 1½ inch separation while the cords in the central area of the rollers may be further spaced apart for example 2 inches. The spacing above described for the cords is accomplished in a convenient manner as later described and requires no alteration of the smooth faced main rollers 11 or 12.

The machine framework at 19, in addition to rotatably supporting in suitable bearings the aforementioned rollers, serves additionally to support a liquid applicator in the form of an open water tank 31. Spaced upwardly from the tank is a first spacer plate 32 for the cords, a section of which plate is shown in FIG. 5. In addition to serving as a spacer for the cords 10, the plate 32 also functions to wipe a semicircular area of each cord as it passes therethrough which area will be the uppermost half of the cord as it travels between rollers 12 and 11.

Also spaced along the runs of the cord extending between the third roller 23 and main roller 12, is a water spray discharge constituting rinse applicator and comprising a bank of nozzles 33 which are spaced along and in communication with a conduit 34 to apply a spray of water to the passing cords. Completing the drying of the cords 10 is a rotary brush indicated at 36, driven in a continuous manner in a counterclockwise direction as viewed in FIG. 1 to dislodge all water particles from the cords 10 passing therethrough. The brush 36 is powered separately by a motor 37 at a high rate of speed relative to the rotational speed of the main rollers 11 and 12 to effect the centrifugal dislodgement of water particles picked up from the cords 10. The water particles are discharged or thrown in a downward direction by the brush which is moving oppositely to the direction of the passing cords. With continuing reference to FIG. 1, it will be seen that the cords upon reaching the upper run will be cleansed of any glue material as aforesaid is necessary for the conveyance of the face sheets of a plywood panel. The inadvertent deposit of glue upon the underside of the veneer sheets known as cores which become the inner laminates, of course has no detrimental effect to the plywood sheet being fabricated.

A second spacer plate is indicated at 38 adjacent to discharge roller 11 and is of like design to that first described and fragmentarily shown in FIG. 5. This second plate 38 also has a secondary function in addition to spacing the cords 10 which is the removal from the cords 10 of loose wood splinters or chips carried by the veneer sheets and deposited on the cords.

With particular attention to FIG. 4 the ends of a single conveyor component or cord are shown with like interengaging hook members being indicated at 40. An important feature of the present invention is the highly convenient manner in which replacement of a cord 10 may be accomplished such a feature being highly desirable in any piece of machinery whose continuous operation is necessary to the entire plywood production line wherein shut downs are costly. As aforesaid the breaking of a cord after a long period of use need not result in replacement thereof until a normal maintenance period at which time it may be done expeditiously.

The cords 10 are of a length to require tensioning to bring the ends together for interengagement of the hook members 40 carried thereby with only a pair of hand pliers being required to complete the attachment. Each member 40 has a threaded segment 41 inserted within the cord's central opening 42 subsequent to which a metal band 43 is compressed about the cord's ends further securing the segment 41 and cord 10. This of course is done in a convenient manner within a shop with one hook member being left in an open position for reception of its cooperating hook member after which the hook is simply closed, as shown in full lines, to complete the cord installation. Various arrangements may be used for enabling the convenient attachment of the cord ends without departing from the present invention.

I claim:

1. A conveyor system for the transfer of successive wood veneer sheets past a glue spray station with the system providing for the removal of overspray and wood fragments from the conveyor components, said system comprising,
   a pair of powered smooth surfaced rollers oppositely disposed from the said material spray station,
   an additional powered roller disposed below said pair of rollers,
   a multitude of independent rubber cords of circular sections entrained in parallel relationship on said rollers for transferring said sheet material, each of said cords having a normal relaxed length less than their stretched length when entrained in place in the conveyor system,
   cooperating hook members inserted in opposite ends of each of said cords whereby a cord may be individually entrained about said rollers and stretched permitting joining of said hook members for tensioned installation of the cord on said rollers,
   a liquid filled tank located along the course of said cords with said additional roller disposed therein to cause said cords to be immersed,
   means simultaneously spacing and wiping a portion of the surface of each of said cords,
   rinse applicator means also located along said course of said cords, and
   a powered brush transversely disposed across the path of said cords with a portion of the brush moving arcuately through and beyond the cords for collecting excess liquid from the cords prior to their receiving sheet material, said brush independently powered at a rotational speed adequately to discharge the collected liquid by centrifugal force.

2. The conveyor system as claimed in claim 1 wherein said means for horizontally spacing each of said cords includes arcuate portions in wiping contact with a semicircular surface of each of said cords.

3. The conveyor system as claimed in claim 1 wherein said hook members are of a reduced size as to not extend beyond a projected periphery of said cords so as to not interfere with cord passage through the spacing and wiping means.